United States Patent
Masson et al.

(10) Patent No.: US 6,506,422 B1
(45) Date of Patent: *Jan. 14, 2003

(54) NUTRITIONAL FORMULA FOR PHENYLKETONURIA PATIENTS

(75) Inventors: Gérard Masson, Cully (CH); Julio Cesar Monti, Jongny (CH); Olivier Ballevre, Lausanne (CH)

(73) Assignee: Nestec S.A., Vevey (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 51 days.

(21) Appl. No.: 09/242,746
(22) PCT Filed: Aug. 25, 1997
(86) PCT No.: PCT/EP97/04761

§ 371 (c)(1),
(2), (4) Date: Feb. 22, 1999

(87) PCT Pub. No.: WO98/08402

PCT Pub. Date: Mar. 5, 1998

(30) Foreign Application Priority Data

Aug. 30, 1996 (EP) .............................. 96202419

(51) Int. Cl.$^7$ .............................................. A23C 11/02
(52) U.S. Cl. ........................ 426/2; 426/656; 426/801; 424/442
(58) Field of Search .......................... 426/801, 2, 656; 424/442

(56) References Cited

U.S. PATENT DOCUMENTS

| | | | |
|---|---|---|---|
| 5,216,129 A | | 6/1993 | Berrocal et al. |
| 5,225,238 A | | 7/1993 | Ardaillon et al. |
| 5,393,532 A | * | 2/1995 | Wachtel et al. .......... 426/656 |
| 5,411,757 A | | 5/1995 | Buist et al. |

FOREIGN PATENT DOCUMENTS

| | | | | |
|---|---|---|---|---|
| DE | 2 117 243 | | 5/1973 | |
| EP | 0 492 183 | | 7/1992 | |
| EP | 492183 | * | 7/1992 | ............ 426/801 |
| GB | 2 223 925 | | 4/1990 | |
| JP | 8165-742 | * | 9/1983 | ............ 426/801 |
| JP | 59-51111 | | 3/1984 | |
| JP | 61-152523 | | 7/1986 | |
| JP | 40-4126051 A | * | 9/1990 | |
| JP | 04126051 | * | 4/1992 | |
| JP | 04-126051 | | 4/1992 | |
| WO | WO 85/03230 | | 8/1985 | |
| WO | 94/15952 | * | 7/1994 | |
| WO | WO 94/17789 | | 8/1994 | |

OTHER PUBLICATIONS

"Casein Macropeptide from Whey—A New Product Opportunity", Food Research Quarterly, vol. 51, Nos. 1 & 2, 1991.

"The Justification Theory: The Essential Nature of the Non–Essential Amino Acids", Nutritional Reviews, vol. 37, No. 7, Jul. 1979.

"Increased Neurotransmitter Biosynthesis in Phenylketonuria Induced by Phenylalanine Restriction or by Supplementation of Unrestricted Diet with Large Amounts of Tyrosine", Eur. J. Pediatr. (1988): 238–245.

"Cognition and Tyrosine Supplementation Among School–Aged Children with Phenylketonuria", AJDC, vol. 146, Nov. 1992.

"Increased Vigilance and Dopamine Synthesis by Large Doses of Tyrosine or Phenylalanine Restriction in Phenylketonuria", Acta Peadiatr. Scand., 76: 560–565, 1987.

"Phenylketonuria Due to Phenylalanine Hydroxylase Deficiency: An Unfolding Story", BMJ, vol. 306, Jan. 1993.

"Clinical Trial of a Concentrated Amino Acid Formula for Older Patients with PKU", E. J. Clin. Nutrit., (1988), 42: 81–86.

"Review of Current Practices in Management of Inherited Disorders of Amino Acid Metabolism in Western Europe", Human Nutrition: Applied Nutrition (1986), 40A, Suppl. 1, 61–69.

"Diet Treatment of PKU UAB No. 46", Commonwealth Agricultural Bureau (1980).

"Phenylketonuria", Ann. Rev. Nutr. (1987), 7:117–135.

Observations by a third party.

Kecskemethy et al., "The Use of Gelatin Capsules for Ingestion of Formula in Dietary Treatment of Maternal Phenylketonuria", J. Inher. Metab. Dis., vol. 16, 1993, pp. 111–118.

Kitagawa et al., "Treatment of Phenylketonuria with a Formula Consisting of Low–Phenylalanine Peptide", Enzyme, vol. 38, 1987, pp. 321–327.

* cited by examiner

Primary Examiner—Helen Pratt
(74) Attorney, Agent, or Firm—Bell, Boyd & Lloyd LLC

(57) ABSTRACT

A nutritional formula for PKU patients. The nutritional formula has, as a protein source, a mixture of caseino-glycomacropeptide and complementary essential amino acids other than Phe to provide a balanced amino acid profile. Vitamins and minerals sufficient to meet daily requirements are also included. When used as a complete diet, the nutritional formula includes a carbohydrate source and a fat source. However the nutrutional formula may also be used as a protein supplement in which case the carbohydrate source and the fat source may be omitted. The nutritional formula has a pleasant taste.

12 Claims, No Drawings

NUTRITIONAL FORMULA FOR PHENYLKETONURIA PATIENTS

FIELD OF THE INVENTION

This invention relates to a nutritional formula having a balanced amino acid profile which is suitable for patients suffering from phenylketonuria.

BACKGROUND TO THE INVENTION

Phenylketonuria (PKU) is an inherited defect of amino acid metabolism which results in an excess of phenylalanine (Phe) in the brain and plasma. If it is not detected and treated early in the life of an infant, the condition leads to irreversible damage of the nervous system, severe mental retardation and poor brain development. Once detected, the condition is treated by providing the infant, and later the child, with a low or Phe-free diet. Also, pregnant women who suffer from the condition are recommended a diet which is free from or low in Phe to avoid the risk of impairment of the development of the foetus and congenital malformation.

However a diet which is composed of natural foods and which is free from or low in Phe, eliminates many source of essential amino acids, vitamins and minerals. Consequently, without supplementation, such a diet would provide inadequate protein, energy, vitamins and minerals to support normal growth and development. Therefore it is common to use nutritional formulas to supplement the diets of PKU patients. Also, for babies, it is common to use infant formulas which have a low Phe content as the sole or primary food source.

Many formulas for PKU patients exist and are described in the literature. In most cases, they fall into two main categories. The first category comprises formulas produced from protein hydrolysates which have been subjected to activated charcoal or gel treatment to remove Phe. The formula disclosed in German patent 2117243 is an example of such a formula. The second category comprises formulas made up of mixtures of free amino acids. The formula disclosed in European patent application 0492138 is an example of such a formula.

The main problem with both types of formula is that they have an extremely bitter taste which is not completely masked by the additional ingredients of the formulas such as sugars. Consequently, it is often difficult to ensure that the patient consumes enough of the formulas to maintain required daily intakes of protein, amino acids, vitamins, minerals, and the like. This is particularly a problem with older children who may require up to 70g, dry weight, of the formulas per day. For example, Schuett, V. E.; 1990; DHHS Publication No HRS-MCH-89-5, reports that more than 40% of PKU patients in the US of eight years or older no longer adhere to the dietary treatment.

Various techniques for masking the bitter taste of the formulas have been attempted; quite often without complete success. For example, Keeskemthy et al; 1993; *J Inherit. Metab. Dis.*; 16(1), 111–118 discloses the use of gelatine capsules which contain the formula and hence mask the taste of the formula. However this is only really suitable for adult patients since it is often difficult to get infants and children to swallow capsules. Similar ideas are disclosed in International patent application WO 85/03230 and U.S. Pat. No. 5,393,532 which disclose coated tablets containing a low Phe formula. As an example of another approach, U.S. Pat. No. 5,411,757 discloses the supplementation of certain low Phe foods with certain L amino acids to provide nutritionally complete foods. The foods are described to be palatable. However the problem is that foods are not as versatile as formulas and are not always suitable for all patients.

Another approach to the problem has been the use of protein fractions which do not appear to have very bitter tastes. For example, the abstract of Japanese patent application J59-5111 describes the use of protein fractions obtained from albumin or milk whey albumin which are low in Phe and have improved taste. Another example is described in Japanese patent application JP4-12605 1. In this case, foods based upon K-casein macropeptides are mentioned as being suitable for PKU patients. However these protein fractions do not provide formulas with all essential amino acids. Further, Kitagawa et al; 1987; *Enzyme*; 38, 321–327 reports that no patients actually liked the formulas based on these protein fractions and most thought they were just as bad as the conventional formulations of the time.

It is therefore an object of this invention to provide a nutritional formula suitable for PKU patients which has improved taste and provides a substantially balanced amino acid profile but which is low in phenylalanine.

SUMMARY OF THE INVENTION

Accordingly, in one aspect, this invention provides a nutritional formula suitable as a complete diet for PKU patients, the nutritional formula comprising:
 a protein source comprising caseino-glyco-macropeptide and complementary essential amino acids other than Phe to provide a balanced amino acid profile including an excess of Tyr;
 a carbohydrate source;
 a fat source; and
 vitamins and minerals sufficient to meet daily requirements.

It is surprisingly found that supplementing caseino-glyco-macropeptide with essential amino acids other than Phe provides a protein source for a nutritional formula which has a good taste, a low osmolarity and a balanced amino acid profile. Further, the nutritional formula has a low Phe content which makes it ideally suited as a diet for PKU patients. The formula also provides an excess of Tyr to compensate for the inability of PKU patients to metabolise Phe into Tyr.

Preferably the protein source provides about 7% to about 13% of the energy of the nutritional formula; the fat source provides about 25% to about 55% of the energy of the nutritional formula; and the carbohydrate source provides about 40% to about 60% of the energy of the nutritional formula.

The protein source preferably comprises about 40% to about 60% by weight of caseino-glyco-macropeptide and about 60% to about 40% by weight of complementary amino acids.

In a further aspect, this invention provides a powdered nutritional formula suitable as a protein supplement for PKU patients, the nutritional formula comprising:
 a protein source comprising caseino-glyco-macropeptide and complementary essential amino acids other than Phe to provide a balanced amino acid profile including an excess of Tyr; and
 vitamins and minerals.

Preferably the protein source provides at least about 80% of the energy of the powdered nutritional formula; more preferably at least about 90%.

Further, the protein source preferably comprises about 40% to about 99% by weight of caseino-glyco-macropeptide and about 60% to about 1% by weight of complementary amino acids.

The complementary essential amino acids may be provided as a mixture of free amino acids and slow release capsules containing one or more poor tasting amino acids; for example Lys, Met, Trp and Val. The protein source preferably provides at least about 1.9 g His/16 gN; at least about 6.6 g Leu/16 gN; at least about 1.1 g Trp/16 gN; and at least about 3.1 g Tyr/16 gN.

In another aspect, this invention provides the use of caseino-glyco-macropeptide and complementary essential amino acids other than Phe in the preparation of a nutritional formula for PKU patients which has a balanced amino acid profile and an excess of Tyr.

In a further aspect, this invention provides a method of providing nutrition to a PKU patient, the method comprising enterally administering to the patient a nutritional composition which includes a protein source including caseino-glyco-macropeptide and complementary essential amino acids other than Phe to provide a balanced amino acid profile including an excess of Tyr; and vitamins and minerals.

DETAILED DESCRIPTION OF THE INVENTION

Embodiments of the invention are now described by way of example only. The following abbreviations for amino acids are used in this specification:

| alanine | Ala | arginine | Arg |
| asparagine | Asn | aspartic acid | Asp |
| cysteine | Cys | glutamine | Gln |
| glutamic acid | Glu | glycine | Gly |
| histidine | His | isoleucine | Ile |
| leucine | Leu | lysine | Lys |
| methionine | Met | phenylalanine | Phe |
| proline | Pro | serine | Ser |
| threonine | Thr | tryptophan | Trp |
| tyrosine | Tyr | valine | Val |

This invention provides nutritional formulas which are suitable as complete diets or as protein supplements for PKU patients. The formulas therefore have a low Phe content. This is achieved by the use of a protein source which includes caseino-glyco-macropeptide and complementary amino acids, other than Phe, for providing a balanced amino acid profile. Vitamins and minerals sufficient to meet daily requirement as also included.

For a nutritional formula intended as a diet for PKU patients, the protein source preferably provides about 7% to about 13% of the energy of the nutritional formula. Fat and carbohydrate may be added to make up the additional energy. However, for a nutritional formula intended as a protein supplement for PKU patients, the protein source preferably provides at least 80% of the energy of the nutritional formula.

The particular caseino-glyco-macropeptide used in the protein source is not critical to the invention. For example, the caseino-glyco-macropeptide may be extracted from milk using suitable processing. For example, the caseino-glyco-macropeptide may be extracted from the retentate obtained from the concentration of whey protein. This may be done by at least partially removing lactose from the retentate and then adding ethanol to cause precipitation. The supernatant is then collected and dried to provide the caseino-glyco-macropeptide. U.S. Pat. No. 5,216,129, of which the disclosure is incorporated by reference, provides a more detailed description of this process. Alternatively, the caseino-glyco-macropeptide may be purchased from commercial sources. For example, the caseino-glyco-macropeptide may be purchased from MD Foods Ingredients amba of DK-6920 Videbaek, Denmark or from DMV International of NCB-laan 80, NL-5460 BA Veghel, The Netherlands.

The complementary amino acids are selected to provide the formula with a balanced amino acid profile since the caseino-glyco-macropeptide does not provide sufficient amounts of all essential amino acids. Despite the fact that certain of these complementary amino acids are known to impart bitter tastes to products, it is surprisingly found that the taste of the nutritional formula is still much improved.

The relative amount of each complementary amino acid used depends upon the age of the intended patients since humans require more or less of certain amino acids depending upon age. Also, the relative amount of each complementary amino acid may depend upon the source of the caseino-glyco-macropeptide since the amino acid profiles of caseino-glyco-macropeptides do vary to some extent. However, organisations such as the Food and Agriculture Organization/World Health Organization have published the essential amino acid requirements for children of various age groups. Also, for infants under the age of about 2 years, an amino acid profile corresponding to that of human milk is generally regarded as desirable. Therefore, the process of selecting the relative amount of each complementary amino acid may be carried out without undue experimentation.

For infants under the age of 2 years, Arg, Cys, Gln, His, Ile, Leu, Lys, Met, Phe, Thr, Trp, Tyr and Val are considered to be essential or conditionally essential amino acids. For nutritional formulas for this age group, the caseino-glyco-macropeptide is supplemented with these amino acids, but not Phe, as is necessary to obtain a balanced amino acid profile. Supplementation of other non-essential amino acids may also be carried out as desired. If no Phe is included in the complementary amino acids, the Phe content of the nutritional formula is sufficiently low to make the formula suitable for PKU patients.

Preferably, for nutritional formulas for infants, the protein source comprises about 40% to about 60% by weight of caseino-glyco-macropeptide and about 60% to about 40% by weight of complementary amino acids. Although amounts of caseino-glyco-macropeptide lower than about 40% by weight may be used, the taste of the formula begins to deteriorate. The complementary amino acids preferably comprise about 7% to about 9% Arg, up to about 6% Asn, about 4% to about 5% Cys or cystine, about 15% to about 17% Gln, about 4% to about 7% His, about 0.5% to about 4.5% Ile, about 18% to about 22% Leu, about 7.5% to about 9.5% Lys, about 0.5% to about 2.5% Met, about 4% to about 6% Trp, about 10% to about 30% Tyr, and about 3.5% to about 6% Val; all percentages being by weight of the complementary amino acids. Arg and Lys may be added in salt form; for example in the form of the HCl salt. The amount of Phe present in the protein source is preferably less than 1 g of Phe per 16 g N.

Also, for nutritional formulas for infants, the protein source preferably provides an amount of Tyr which is greater than the relative amount in human milk; for example at least about 120% the amount in human milk; more preferably 140%. In this way, the impaired ability of PKU infants to convert Phe to Tyr may be compensated for.

For children over the age of 2 years or adults, Cys, His, Ile, Leu, Lys, Met, Phe, Thr, Trp, Tyr and Val are considered to be essential or conditionally essential amino acids. As for nutritional formulas for infants, the caseino-glyco-macropeptide is supplemented with these amino acids, but not Phe, as is necessary to obtain an acceptable amino acid profile. Again supplementation of other non-essential amino acids may also be carried out as desired. If no Phe is included in the complementary amino acids, the Phe content of the nutritional formula is sufficiently low to make the formula suitable for PKU patients.

For nutritional formulas for children or adults, the protein source may comprise about 40% to about 99% by weight of caseino-glyco-macropeptide and about 60% to about 1% by weight of complementary amino acids. However, the protein source preferably comprises about 80% to about 97% by weight of caseino-glyco-macropeptide and about 20% to about 3% by weight of complementary amino acids. The complementary amino acids preferably comprise up to about 15% Cys or cystine, about 5% to about 10% His, about 15% to about 30% Leu, about 5% to about 12% Trp, and about 30% to about 50% Tyr; all percentages being by weight of the complementary amino acids. It is also possible to use the nutritional formula for infants. The amount of Phe present in the protein source is preferably less than 1 g aa/16 gN.

Also, for nutritional formulas for children and adults, the protein source preferably provides an amount of Tyr which is greater than the amount recommended by the Food and Agriculture Organisation for persons over the age of 2 years; for example at least about 120% the recommended amount. The recommended amount is 3.1 g Tyr/16 gN. In this way, the impaired ability of PKU patients to convert Phe to Tyr may be compensated for.

The protein source may be used as a simple mixture of the caseino-glyco-macropeptide and complementary amino acids; particularly if the caseino-glyco-macropeptide comprises the majority of the protein source. However it is also possible to encapsulate those essential amino acids which impart an unpleasant taste. For example, the amino acids Lys, Met, Trp and Val, when present in the complementary amino acids, may first be encapsulated in slow release capsules. The protein source then comprises a mixture of caseino-glyco-macropeptide, slow release capsules which contain one or more of Lys, Met, Trp and Val, and the remaining complementary amino acids. When such a protein source is used, it is found that the taste of the nutritional formula improves even further.

The amino acids may be encapsulated using any suitable technique for encapsulating amino acids. For example, the amino acids may be mixed with molten edible fats which are ordinarily solid at room temperature. The molten fats are then cooled, frozen and ground to powder. The powder may then be used as the encapsulated amino acids. Examples of suitable fats are hydrogenated palm oil and hydrogenated sunflower oil. Fillers such as maltodextrin may also be incorporated into the capsule walls. Alternatively encapsulation processes as described in WO 94/17789, GB 2223925, JP 61-152623, EP 0447298 and the like. Clearly, the encapsulation technique used should not adversely affect the bioavailability of the amino acids to a significant extent. Also, if the nutritional formula is in powdered form, the capsules should be able to withstand the reconstitution of the nutritional formula in hot water.

If the nutritional formula includes a fat source, the fat source preferably provides about 25% to about 55% of the energy of the nutritional formula. The lipids making up the fat source may be any suitable fat or fat mixture. Vegetable fats are particularly suitable; for example soy oil, palm oil, coconut oil, safflower oil, sunflower oil, corn oil, canola oil, lecithins, and the like. Animal fats such as milk fats may also be added if desired. The lipids may also include medium-chain triglycerides; for example up to about 30% by weight of medium-chain triglycerides. Fractionated coconut oil is a suitable source of medium-chain triglycerides.

If the nutritional formula includes a carbohydrate source, the carbohydrate source preferably provides about 40% to about 60% of the energy of the nutritional formula. Any suitable carbohydrates may be used, for example sucrose, lactose, glucose, fructose, corn syrup solids, and maltodextrins.

Suitable vitamins and minerals are included in the usual manner to meet the appropriate guidelines.

One or more food grade emulsifiers may be incorporated into the nutritional formula if desired; for example diacetyl tartaric acid esters of mono-diglycerides, lecithin and mono- and di-glycerides. Similarly suitable salts and stabilizers may be included.

The nutritional formula may be prepared in any suitable manner. For example, for a nutritional formula intended as a complete diet, the nutritional formula may be prepared by blending together the protein source (with the exception of any heat sensitive capsules), the carbohydrate source, and the fat source in appropriate proportions. If used, the emulsifiers may be included in the blend. The vitamins and minerals may be added at this point but are usually added later to avoid thermal degradation. Any lipophilic vitamins, emulsifiers and the like may be dissolved into the fat source prior to blending. Water, preferably water which has been subjected to reverse osmosis, may then be mixed in to form a liquid mixture. The temperature of the water is conveniently about 50° C. to about 80° C. to aid dispersal of the ingredients. Commercially available liquefiers may be used to form the liquid mixture.

The liquid mixture may then be thermally treated to reduce bacterial loads. For example, the liquid mixture may be rapidly heated to a temperature in the range of about 80° C. to about 110° C. for about 5 seconds to about 5 minutes. This may be carried out by steam injection or by heat exchanger; for example a plate heat exchanger.

The liquid mixture may then be cooled to about 60° C. to about 85° C.; for example by flash cooling. The liquid mixture is then homogenized; for example in two stages at about 7 MPa to about 40 MPa in the first stage and about 2 MPa to about 14 MPa in the second stage. The homogenized mixture may then be further cooled to add any heat sensitive components; such as vitamins and minerals. The pH and solids content of the homogenized mixture is conveniently standardized at this point.

If it is desired to produce a powdered nutritional formula, the homogenized mixture is transferred to a suitable drying apparatus such as a spray drier or freeze drier and converted to powder. The powder should have a moisture content of less than about 5% by weight. If capsules containing bitter tasting amino acids are used and these capsules are heat sensitive, they may be added to the powder at this point.

If it is desired to produce a liquid formula, the homogenized mixture is preferably aseptically filled into suitable containers. Aseptic filling of the containers may be carried out by pre-heating the homogenized mixture (for example to about 75 to 85° C.) and then injecting steam into the homogenized mixture to raise the temperature to about 140 to 160° C.; for example at about 150° C. The homogenized mixture may then be cooled, for example by flash cooling, to a temperature of about 75 to 85° C. The homogenized mixture may then be homogenized, further cooled to about room temperature and filled into containers. Suitable apparatus for carrying out aseptic filling of this nature is commercially available. The liquid formula may be in the form of a ready to feed formula having a solids content of about 10 to about 14% by weight or may be in the form of a concentrate; usually of solids content of about 20 to about 26% by weight.

Nutritional formulas which are intended as protein supplements may be prepared, for example, by mixing together, in powdered form, the protein source, the vitamins, and the minerals. If carbohydrates are added, these too may be added in powdered form. It is of course possible to place all the ingredients into liquid form as described above and then spray dry them to powder, but this is not necessary. The protein supplements may be added to foods ordinarily consumed by PKU patients.

The nutritional formula may be used as a nutritional support for patients suffering from, or at risk of, phenylketonuria. The amount of the nutritional formula required to be fed to a patient will vary depending upon factors such as the patient's condition, the patient's body weight, the age of the patient, and whether the nutritional formula is the sole source of nutrition. However the required amount may be readily set by a medical practitioner. In general, sufficient of the nutritional formula is administered to provide the patient with about 1 g protein to about 4.0 g protein per kg of body weight per day. If the nutritional formula is used as a supplement to other foods, the amount of the nutritional formula that is administered daily may be decreased accordingly.

EXAMPLE 1

Formulas for Infants Up to the Age of 2

Two nutritional formulas are prepared by combining powdered caseino-glyco-macropeptide and powdered amino acids and dry mixing the ingredients. In one formula (Formula 1), caseino-glyco-macropeptide obtained by the process described in U.S. Pat. No. 5,216,129 is used in the protein source. In the other formula (Formula 2), caseino-glyco-macropeptide purchased from MD Foods Ingredients amba (under the name PSDI-3400) is used in the protein source. In Formula 1, the caseino-glyco-macropeptide comprises 50% by weight of the protein source; the remainder being complementary amino acids. In Formula 2, the caseino-glyco-macropeptide comprises 49% by weight of the protein source; the remainder being complementary amino acids.

The amino acid profiles of the protein sources used in the two formulas are as follows:

| Amino acid | Human Milk-Reference (g aa/16 g N) | Formula 1 (g aa/16 g N) | Added amino acid (%) | Formula 2 (g aa/16 g N) | Added amino acid (%) |
|---|---|---|---|---|---|
| Ala | 5.1 | 3.7 | | 3.5 | |
| Arg | 5.1 | 4.6 | 7.7 | 4.6 | 8.0 |
| Asn | ? | ? | | ? | |
| Asp + Asn | 11.2 | 5.6 | | 5.5 | |
| Cys | 2.4 | 2.4$^1$ | 4.4 | 2.4$^1$ | 4.4 |
| Gln | | 8.0 | 15.5 | 8.3 | 16.1 |
| Glu + Gln | 21.3 | 21.3 | | 21.3 | |
| Gly | 3.4 | 3.4 | 4.8 | 3.4 | 5.2 |
| His | 3.2 | 3.2 | 5.2 | 3.2 | 5.8 |
| Ile | 6.7 | 6.7 | 3.3 | 6.7 | 0.8 |
| Leu | 12.4 | 12.4 | 19.1 | 12.4 | 20.1 |
| Lys | 8.3 | 8.3$^2$ | 8.3 | 8.3$^2$ | 8.6 |
| Met | 1.7 | 1.7 | 1.7 | 1.7 | 0.8 |
| Pro | 11.3 | 11.3 | 7.2 | 11.3 | 7.7 |
| Ser | 6.0 | 4.9 | | 4.6 | |
| Thr | 6.1 | 9.1 | | 9.8 | |
| Trp | 2.7 | 2.7 | 5.1 | 2.7 | 5.0 |
| Tyr | 4.7 | 7.0 | 13.0 | 7.0 | 13.2 |
| Val | 7.3 | 7.3 | 4.7 | 7.3 | 4.5 |
| Phe | 4.8 | 0.8 | | 0.4 | |
| Total | 123 | 116 | 100 | 116 | 100 |

In the table, the superscripts:
$^1$mean added as cystine
$^2$mean added as Lys HCl Both formulas have a well balanced amino acid profile which is close to that of human milk. Further both have low levels of Phe; less than the recommended maximum of 1 g Phe/16 g N. The Tyr levels are about 150% of that of human milk to take into account the impaired ability of PKU infants to convert Phe in Tyr.

The formulas are each dissolved in warm water and tasted. The taste is categorised as good.

EXAMPLE 2

Formulas for Children Aged 2 and Above

The process of example 1 is repeated to produce two nutritional formulas.

In one formula (Formula 3), caseino-glyco-macropeptide obtained by the process described in U.S. Pat. No. 5,216,129 is used in the protein source. In the other formula (Formula 4), caseino-glyco-macropeptide purchased from MD Foods Ingredients amba (under the name PSDI-3400) is used in the protein source. In Formula 3, the caseino-glyco-macropeptide comprises 94% by weight of the protein source; the remainder being complementary amino acids. In Formula 4, the caseino-glyco-macropeptide comprises 92% by weight of the protein source; the remainder being complementary amino acids.

The amino acid profiles of the protein sources used in the two formulas are as follows:

| Amino acid | FAO/WHO-Reference (g aa/16 g N) | Formula 3 (g aa/16 g N) | Added amino acid (%) | Formula 4 (g aa/16 g N) | Added amino acid (%) |
|---|---|---|---|---|---|
| Ala | | 6.9 | | 6.7 | |
| Arg | | 1.1 | | 0.8 | |
| Asn | | | | | |
| Asp + Asn | | 10.5 | | 10.4 | |
| Cys | 1.3 | 1.3$^1$ | 11.9 | 1.3$^1$ | 10.1 |
| Gln | | | | | |
| Glu + Gln | | 25.0 | | 24.6 | |
| Gly | | 1.9 | | 1.4 | |
| His | 1.9 | 1.9 | 9.1 | 1.9 | 13.6 |
| Ile | 2.8 | 9.3 | | 11.9 | |

-continued

| Amino acid | FAO/WHO-Reference (g aa/ 16 g N) | Formula 3 (g aa/ 16 g N) | Added amino acid (%) | Formula 4 (g aa/ 16 g N) | Added amino acid (%) |
|---|---|---|---|---|---|
| Leu | 6.6 | 6.6 | 19.9 | 6.8 | 28.9 |
| Lys | 5.8 | 7.6[2] | | 7.3[2] | |
| Met | 1.3 | 1.6 | | 2.5 | |
| Pro | | 14.3 | | 13.8 | |
| Ser | | 9.2 | | 8.8 | |
| Thr | 3.4 | 17.1 | | 18.6 | |
| Trp | 1.1 | 1.1 | 11.7 | 1.1 | 8.4 |
| Tyr | 3.1 | 4.6 | 47.3 | 4.4 | 39.0 |
| Val | 3.5 | 9.1 | | 9.3 | |
| Phe | 3.2 | 1.6 | | 0.7 | |
| Total | | 130 | 100 | 132.3 | 100 |

[1] added as cystine
[2] added as Lys HCl

Both formulas have a well balanced amino acid profile which is close to that of the FAO/WHO standard. Further both have low levels of Phe. The Tyr levels are raised to take into account the impaired ability of PKU infants to convert Phe in Tyr.

The formulas are each dissolved in warm water and tasted. The taste is categorised as good.

EXAMPLE 3

Taste Comparison

An amount of Formula 1 to provide 30 g/l is dissolved in cold tap water. A similar amount of a formula (Formula A) which is based upon a mixture of free amino acids is also dissolved in cold tap water. The pH and osmolarity of each solution is determined and each solution is tasted by a panel of 9 tasters. The tasters are asked to rate the bitterness and alkaline taste of each solution on a scale that runs from 1 (indicating no bitterness and alkaline taste) to 4 (indicating high bitterness and alkaline taste).

The results are as follows:

| | Formula 1 | Formula A |
|---|---|---|
| Bitterness | 2.6 | 4 |
| Alkaline pH | 1.8 | 4 |
| Osmolarity (mOsmol/l) | 5 113 | 4 231 |

The results indicate that Formula 1 has much improved taste characteristic, a more neutral pH and an osmolarity near half that of Formula A.

EXAMPLE 4

Encapsulated Formula i) Production

A first amino acid mix made up of 41.87% Lys HCl, 8.57% Met, 27.92% Trp and 21.64% Val is prepared; all percentages being by weight. The first amino acid mix is separated into four equal amounts. A fat mix is added to each amino acid mix under mixing at 70° C. The mixtures are homogenised and cooled to 30° C. to cause crystallisation of the fats. Each mixture is frozen to −45° C. for 15 minutes and then ground under freezing conditions to particles of size about 1 mm. The four powders are labelled sample 5 to 8 and have the following composition:

| | Sample 5 | Sample 6 | Sample 7 | Sample 8 |
|---|---|---|---|---|
| Hydrogenated Palm oil (m.p. 50° C.) | 80% | 60% | — | 60% |
| Hydrogenated Sunflower Oil (m.p. 70° C.) | — | — | 80% | — |
| Maltodextrin | — | 20% | — | — |
| Amino acid mix | 20% | 20% | 20% | 40% |

A second amino acid mix made up of 10.4% Arg, 2.99% Cys, 18.44% Gln, 6.28% Gly, 6.91% His, 3.51% Ile, 25.49% Leu, 8.24% Pro, and 17.71% Tyr, is prepared; all percentages being by weight. Four formulas are then prepared according to the process of example 1. The protein source in each formula comprises about 36% by weight of caseino-glyco-macropeptide obtained by the process described in U.S. Pat. No. 5,216,129, about 29% by weight of the second amino acid mix, and about 35% by weight of one of samples 5 to 8. These formulas are labelled Formulas 5 to 8. For comparison, four further formulas are prepared but containing, separately, the first amino acid mix in unencapsulated form and the fat mixture. These formulas are labelled Formulas B to E.

ii) Taste

A small amount of each formula, in powdered form, is tasted by a panel of 6 members. Formulas 5 to 8 are rated to have equally good or better taste than Formulas B to E. The formulas are then each dissolved in cold tap water to provide a concentration of 30 g/l. The formulas are again tasted by the panel. A majority of the panel determine the taste of Formulas 5 to 8 to be much better than that of Formulas B to E.

When compared to the Formula A of example 3, Formulas 5 to 8 are determined to have vastly better taste.

iii) Temperature resistance

An amount of 1.5 g of each of formulas 5 to 8 is dissolved in 100 ml of tap water at several temperatures in the range of 21° C. to 80° C. The beverage is shaken by hand 30 times and left to cool to room temperature. At defined times, an aliquot of 100 μl of each beverage is taken, diluted 30 times, and subjected to U.V. analysis at 278 nm to determine Trp release from the capsules (the Trp providing an indicator of amino acid release). For all formulas, release of the encapsulated Trp is low at temperatures below 45° C. Hence the formulas may be used at low temperatures without loss of the taste-masking effect of the capsules.

Above 45° C., release of the encapsulated Trp in formulas 5,6 and 8 becomes rapid. However, for formula 7, temperatures up to about 65° C. may be used without excessive release of the encapsulated amino acids.

iv) Bioavailability

An amount of each of formulas 5 to 8 is digested using pepsin in 16 ml of 0.1N HCl for 30 minutes at 37° C. An amount of NaOH is added to adjust the pH to 7.5 and pancreatin is added. The solution is then dialysed for 6 hours against a phosphate buffer. Aliquots of dialysate are sampled at various times and subjected to U.V. analysis at 278 nm to determine Trp release from the capsules.

For formulas 6 to 8, almost or all of the Trp is released from the capsules. Release of Trp from the capsules of formula 5 is lower but is still acceptable. This in vitro model provides an underestimate of in vivo digestion and hence the bioavailability of the encapsulated amino acids is considered acceptable to excellent.

EXAMPLE 5

An infant formula is prepared by combining about 46% by weight of a carbohydrate source (sucrose), about 17% by weight of a protein source, about 27% by weight of lipids (a mixture of coconut, soy and palm oils), about 0.5% by weight soy lecithin and salts. The protein source comprises 49% by weight of a caseino-glyco-macropeptide purchased from MD Foods Ingredients amba (under the name PSDI-3400); the remainder being complementary amino acids. Water at about 68° C. is added and the mixture is liquefied for about 10 minutes. The mixture is heated to about 80° C. in a plate heat exchanger; the temperature being held for about 15 seconds. The mixture is then homogenized in two stages at about 70° C.; the first stage at 20 MPa and the second stage at about 3.5 MPa. The homogenized mixture is cooled to 5.6° C., vitamins and minerals are added and the pH is standardized to 6.7 to 6.9. The mixture is then pumped to a spray tower and spray-dried to provide a powder containing about 2% to about 3% by weight moisture.

The infant formula is dissolved in warm water and tasted by a panel. The taste is determined to be good.

What is claimed is:

1. A nutritional formula suitable as a complete diet for PKU patients, the nutritional formula comprising:

a protein source comprising caseino-glyco-macropeptide and complementary essential amino acids other than Phe to provide a balanced amino acid profile including an excess of Tyr wherein the protein source comprises about 40% to about 60% by weight of caseino-glyco-macropeptide and about 60% to about 40% by weight of complementary amino acids that include a mixture of free amino acids and slow release capsules containing one or more of Lys, Met, Trp and Val;

a carbohydrate source;

a fat source; and vitamins and minerals sufficient to meet daily requirements.

2. A nutritional formula according to claim 1 in which the protein source provides about 7% to about 13% of the energy of the nutritional formula, the fat source provides about 25% to about 55% of the energy of the nutritional formula, and the carbohydrate source provides about 40% to about 60% of the energy of the nutritional formula.

3. A nutritional formula according to claim 1 in which the complementary amino acids in addition to Gln comprise about 7% to about 9% Arg or a salt thereof, up to about 6% Asn, about 4% to about 5% Cys or cystine, about 4% to about 7% His, about 0.5% to about 4.5% Ile, about 18% to about 22% Leu, about 7.5% to about 9.5% Lys or a salt thereof, about 0.5% to about 2.5% Met, about 4% to about 6% Trp, about 10% to about 30% Tyr, and about 3.5% to about 6% Val; all percentages being by weight of the complementary amino acids.

4. A powdered nutritional formula suitable as a protein supplement for PKU patients, the nutritional formula comprising:

a protein source comprising caseino-glyco-macropeptide and complementary essential amino acids other than Phe to provide a balanced amino acid profile including an excess of Tyr wherein the protein source comprises about 40% to about 60% by weight of caseino-glyco-macropeptide and about 60% to about 40% by weight of complementary amino acids that include a mixture of free amino acids and slow release capsules containing one or more of Lys, Met, Trp and Val; and vitamins and minerals.

5. A nutritional formula according to claim 4 in which the protein source provides at least about 80% of the energy of the powdered nutritional formula.

6. A nutritional formula according to claim 4 in which the protein source comprises about 40% to about 99% by weight of caseino-glyco-macropeptide and about 60% to about 1% by weight of complementary amino acids.

7. A nutritional formula according to claim 4 in which the complementary amino acids in addition to Gln comprise up to about 15% Cys or cystine, about 5% to about 10% His, about 15% to about 30% Leu, about 5% to about 12% Trp, and about 30% to about 50% Tyr; all percentages being by weight of the complementary amino acids.

8. A method of providing nutrition to a PKU patient, the method comprising enterally administering to the patient a nutritional composition which includes a protein source including caseino-glyco-macropeptide and complementary essential amino acids other than Phe to provide a balanced amino acid profile including an excess of Tyr wherein the protein source comprises about 40% to about 60% by weight of caseino-glyco-macropeptide and about 60% to about 40% by weight of complementary amino acids that include a mixture of free amino acids and slow release capsules containing one or more of Lys, Met, Trp and Val; and vitamins and minerals.

9. A nutritional formula suitable as a complete diet for one or more infants suffering from PKU, the nutritional formula comprising:

a protein source comprising caseino-glyco-macropeptide and complementary essential amino acids other than Phe to provide a balanced amino acid profile including an excess of Tyr wherein the protein source comprises about 40% to about 60% by weight of caseino-glyco-macropeptide and about 60% to about 40% by weight of complementary amino acids that include a mixture of free amino acids and slow release capsules containing one or more of Lys, Met, Trp and Val;

a carbohydrate source;

a fat source; and vitamins and minerals sufficient to meet daily requirements.

10. A nutritional formula according to claim 9 in which the protein source provides about 7% to about 13% of the energy of the nutritional formula, the fat source provides about 25% to about 55% of the energy of the nutritional formula, and the carbohydrate source provides about 40% to about 60% of the energy of the nutritional formula.

11. A nutritional formula according to claim 9 in which the complementary amino acids in addition to Gln comprise about 7% to about 9% Arg or a salt thereof, up to about 6% Asn, about 4% to about 5% Cys or cystine, about 4% to about 7% His, about 0.5% to about 4.5% Ile, about 18% to about 22% Leu, about 7.5% to about 9.5% Lys or a salt thereof, about 0.5% to about 2.5% Met, about 4% to about 6% Trp, about 10% to about 30% Tyr, and about 3.5% to about 6% Val; all percentages being by weight of the complementary amino acids.

12. A nutritional formula according to claim 9 wherein the nutritional formula is in a powdered form.

* * * * *